3,042,705
PREPARATION OF ARYL NITRILES BY CATALYZED REACTION OF AROMATIC HYDROCARBONS WITH HYDROGEN CYANIDE
William L. Fierce, Crystal Lake, and Walter J. Sandner, Carpentersville, Ill., assignors to The Pure Oil Company, Chicago, Ill., a corporation of Ohio
No Drawing. Filed Nov. 23, 1959, Ser. No. 854,561
12 Claims. (Cl. 260—465)

This invention relates to new and useful improvements in processes for the preparation of aromatic nitriles, particularly benzonitrile, by reaction of benzene with hydrogen cyanide at elevated temperatures in the presence of a catalyst.

Benzonitrile is a well known organic chemical which is useful as an intermediate for the preparation of a variety of organic compounds. Merz and Weith reported in Ber., 10, 753 (1877), that cyanogen and benzene react when passed through a hot tube (glowing faintly red) to form benzonitrile and terephthalonitrile in very small amounts, as well as small amounts of diphenyl. J. N. Cosby, in U. S. Patent 2,449,643, reports the production of benzonitrile by the high-temperature reaction of hydrogen cyanide with benzene or with biphenyl. In the Cosby patent, it is reported that mixtures of benzene or diphenyl and hydrogen cyanide react at temperatures in the range from 500°–1100° C. Cosby reports that the reaction may be carried out in the presence or absence of catalysts and states that no provision need be made for catalyzing the reaction. In the absence of catalysts, it is stated that the reaction proceeds at adequate rates at temperatures above 750° C., although it is preferred to to heat the reactants to temperatures of about 900°–950° C. Cosby indicates that in the presence of catalysts, lower temperatures may be employed, but no catalysts are disclosed to be useful in this process.

It is one object of this invention to provide a new and improved process for the preparation of arylnitriles by the catalyzed high-temperature reaction of hydrogen cyanide with benzene, diphenyl or naphthalene.

A feature of this invention is the provision of a process for the reaction of benzene, diphenyl or naphthalene with hydrogen cyanide in the presence of a catalyst consisting of a high-surface-area refractory oxide or a group VIII noble metal on a refractory support.

Another feature of this invention is the provision of a process for production of benzonitrile by reaction of benzene with hydrogen cyanide at temperatures in the range of about 450°–1000° C. in contact with a catalyst consisting of a high-surface-area, refractory oxide or a group VIII noble metal supported on a refractory support.

Other objects and features of this invention will become apparent from time to time throughout the specification and claims as hereinafter related.

This invention is based upon our discovery that arylnitriles are produced in enhanced yields by reaction of benzene, diphenyl or naphthalene with hydrogen cyanide at temperatures in the range from about 450°–1000° C. in contact with a catalyst consisting of a high-surface-area refractory oxide (such as activated alumina) or a refractory support having deposited thereon a small amount of a group VIII noble metal. The support used is preferably a high-surface area, refractory oxide, such as activated alumina, or a silica-alumina cracking catalyst, although low-surface-area supports, such as pumice, or non-porous, refractory material, can be used. The proportion of the group VIII noble metal (viz., platinum, palladium, iridium, osmium, or rhodium) is not critical, but for purposes of economy, is preferably in the range from about 0.05–2.0% wt. The high-surface-area- refractory oxides have substantial catalytic properties when used alone. Within the aforementioned range of temperature, hydrogen cyanide reacts with benzene or diphenyl to produce benzonitrile, or with naphthalene to produce naphthonitrile in substantially greater yields that are obtained in the absence of the catalyst.

This reaction proceeds well at atmospheric pressure, although it may be carried out at either subatmospheric or superatmospheric pressures. In carrying out this reaction, the preferred mol ratio of reactants is in the range 0.1–10 mols of hydrogen cyanide per mol of benzene. The reaction gases may be passed through the reaction zone at a gaseous hourly space velocity of approximately 50–1000, with a space velocity of 150–500 being preferred. In this process, the term "space velocity" refers to the ratio of the volume of the reactant gases at standard temperature and pressure charged per hour to the volume of the reaction space.

In carrying out this process, the benzene and hydrogen cyanide may be premixed and preheated, or may be separately charged to the catalyst-containing reaction zone which is maintained at the desired reaction temperature. Any type of reactor which is resistant to attack by the reactants or the reaction products may be used. Quartz, high-silica glass, stainless steel, or other refractory or corrosion-resistant materials may be used. The reactor may be heated by any suitable means, such as combustion gases applied externally to the reactor, or may be heated by external or internal electric means, including resistance heaters and induction heaters, or by heating tubes extending through the reactor. Another method of heating, which has been developed in recent years and which is particularly useful in this process, is the use of hot refractory pebbles, which are intermittently heated to the desired reaction temperatures. When the hot refractory pebbles are used in this process, they may also be used as the means of support for the catalyst.

The product gases from the reaction zone consist of a mixture of benzonitrile, unreacted hydrogen cyanide and benzene and unidentified by-product gases, probably including hydrogen and ammonia. These reaction gases are withdrawn from the reaction zone and cooled to a temperature sufficiently low to condense the product nitriles. The product which is condensed from the reaction gases will ordinarily have to be fractionated to obtain pure benzonitrile. The unreacted benzene and/or hydrogen cyanide may be recycled to the reaction zone with additional quantities of benzene and hydrogen cyanide for further reaction. In the experiments which were carried out, gas samples of the charge and product gases were analyzed by the mass spectrometer and liquid products were analyzed by infrared spectroscopy.

The following non-limiting examples are illustrative of the scope of this invention.

*Example I*

A gaseous mixture of helium and hydrogen cyanide was contacted with benzene held at a temperature of about 700°–800° C. The mixture passed through a vertically-mounted, electrically-heated reactor tube of Vycor high-silica glass heated to the desired reaction temperature. Samples of the charge and product gases from each run were taken and analyzed by the mass spectrometer. Liquid products obtained were analyzed by infrared spectroscopy. In one run, using a benzene/hydrogen cyanide mol ratio of 1.0, a reaction zone temperature of 702° C., and a gaseous hourly space velocity of charge gases of 200, for a period of 40 minutes, there was a 5.7% conversion of hydrogen cyanide, and a 4.4% conversion of benzene. Benzonitrile was obtained in a yield of 0.07%, based on hydrogen cyanide charged, and a selectivity of 1.5%, based on benzene consumed in the reaction. In a second run, using this apparatus, at a benzene/hydrogen cyanide mol ratio of 1.2, a reaction zone temperature of 807° C., and gaseous hourly space velocity of 209, there was a 6.7% conversion of hydrogen cyanide and 1.2% yield of benzonitrile based on hydrogen cyanide charged (representing a 1% yield based on benzene).

*Example II*

In another series of experiments, using the apparatus of Example I, the reaction tube was filled with a catalyst consisting of 0.5% wt. rhodium on alumina pellets. The catalyst used in these runs was predried over night at 500°–600° C. before carrying out the experiment. Hydrogen cyanide, benzene, and helium diluent were charged, as in Example I, to the reactor tube at a benzene/hydrogen cyanide mol ratio of 0.93. The reactor tube was maintained at 508° C. and the reactants were passed therethrough at a gaseous hourly space velocity of 360, for a period of 30 minutes. In this run, there was a 59.4% conversion of hydrogen cyanide and a 8.6% conversion of benzene. Benzonitrile was obtained in a yield of 7.8% based on hydrogen cyanide charged, and 8.4, based on benzene charged. The benzonitrile obtained in this run represented a selectively of 97.8%, based on benzene consumed, and, thus, the reaction is substantially quantitative with respect to benzene consumed, provided that unreacted benzene is recycled.

In a second run, using the same apparatus and catalyst, benzene and hydrogen cyanide in a mol ratio of 0.95 were charged to the reactor tube in a gaseous hourly space velocity of 378 for a period of 30 minutes. The reaction zone was maintained at a temperature of 659° C. Under these conditions, there was a 41.6% conversion of hydrogen cyanide and a 34.8% conversion of benzene. Benzonitrile was obtained in a yield of 8.9% per pass, based on hydrogen cyanide charged (representing a yield of 9.4% based on benzene charged).

*Example III*

In another series of experiments, using the apparatus of Examples I and II, the reaction tube was filled with a catalyst consisting of (Alcoa F-10) activated alumina. Hydrogen cyanide, benzene, and helium diluent were charged, as in the other examples, at a benzene/hydrogen cyanide mol ratio of 1.3. The reactor tube was maintained at 503° C. and the reactants were passed therethrough at a gaseous hourly space velocity of 376 for 40 minutes. In this run, there was a 22.0% conversion of hydrogen cyanide and substantially no conversion of benzene. Benzonitrile was obtained in a yield of 1.2% (and selectively of 5.3%) based on hydrogen cyanide.

In a second run, using the same apparatus and catalyst, benzene and hydrogen cyanide in a mole ratio of 1.4 were charged to the reactor tube (maintained at 647° C.) at a space velocity of 383 for 40 minutes. Under these conditions, there was a 50.5% conversion of hydrogen cyanide and a 13.4% conversion of benzene. Benzonitrile was obtained in a yield of 16.4% per pass based on hydrogen cyanide (or 11.6% based on benzene) and a selectivity of 32.4% based on hydrogen cyanide converted (or 86.5% based on benzene converted).

Similar results are obtained when other high-surface-area refractory oxides, such as silica-alumina, silica-magnesia, etc., are substituted for alumina as a catalyst in the process.

In carrying out the reaction of benzene with hydrogen cyanide, it is apparent that the activated alumina catalyst or the rhodium on alumina catalyst promotes the formation of benzonitrile in substantially higher yields than are obtained in the absence of catalyst. This catalytic effect is present throughout the entire temperature range from 450°–1000° C., although at temperatures above about 650° C., the improvement in benzonitrile yield is not as great as in the range from about 450°–650° C. The group VIII noble metals are generally effective for catalyzing the reaction of hydrogen cyanide with benzene at elevated temperatures when supported on any suitable refractory support. There is some catalytic effect produced by the support as well as the group VIII noble metal, and so the catalysts which are supported on alumina are preferred. When the apparatus used in this example is charged with a catalyst consisting of 0.5% wt. palladium on alumina, 0.5% wt. platinum on alumina, 0.5% iridium on alumina, 0.5% wt. osmium on alumina, activated alumina, or silica-alumina, and the reaction of benzene and hydrogen cyanide effected in contact therewith, there is a substantial improvement in benzonitrile yield over the uncatalyzed reaction.

While we have described our invention fully and completely with spectial emphasis upon several preferred embodiments, we wish it understood that other reaction conditions may be used. For example, the catalysts which may be used in this process include group VIII noble metals, such as rhodium, platinum, palladium, iridium, and osmium, supported on a suitable refractory support. When carried on a refractory support, the proportion of the group VIII noble metal is determined largely by economic considerations and may be in the range from 0.05 to 2.0% wt. of the support. Refractory supports which are suitable as catalyst carriers include high-surface-area, refractory oxides, such as activated alumina, silica-alumina cracking catalysts, silica gel, and other refractory mixed-oxide gels, and low-surface-area, refractory materials, such as alumina, silica, pumice, etc. Catalysts having high-surface-area supports, are the most active ones. The reaction between hydrogen cyanide and benzene takes place in the range from about 450°–1000° C. using these catalysts, and at all temperatures in this range the catalyzed reaction is markedly superior to the uncatalyzed reaction. Generally, the preferred temperature range is about 500°–600° C., but this may vary, depending upon the particular catalyst used (e.g., 500°–650° C. is preferred for alumina catalyst) and the ratio of reactants. The benzene and hydrogen cyanide react generally under the conditions of this process in almost any mixture, provided that the proper catalyst and reaction temperature are selected. Generally, the preferred ratio of reactants used varies from 0.1–10 mols of hydrogen cyanide per mol of benzene. When a molar excess of hydrogen cyanide is used, there is some increase in the yield of benzonitrile, but there is some indication that a higher temperature may be required. The reactants may be fed at gaseous hourly space velocity range from 50–2000, although rates of feed outside this range may be used if desired. At very low feed rates, e.g., less than 50, yields are extremely low due to the decomposition of benzene and formation of undesired by-products of hydrogen cyanide. At very high space velocities, the reaction rate is extremely low due to insufficient residence time in the reactor. It is apparent therefore that this reaction is not completely inoperative when the reactants are fed at space velocities outside the range of 50–2000, although that range of space velocity is highly preferred. Because of the very high temperature at which this reaction is carried out, it is preferred that this process be operated at atmospheric or a very slight superatmospheric pressure, e.g., 15–20 p.s.i.a.

Similar improvements, i.e., higher yield, or lower temperatures, or both, can be obtained by using the catalysts of this invention to promote the reaction of other unsubstituted aromatic hydrocarbons, such as diphenyl and naphthalene, with hydrogen cyanide.

The embodiments of the invention in which an exclusive property or privilege is claimed are defined as follows:

1. A method of preparing arylnitriles which comprises reacting an aromatic hydrocarbon selected from the group consisting of benzene, diphenyl, and naphthalene with hydrogen cyanide at a temperature in the range of about 450°–1000° C. in contact with a catalyst selected from the group consisting of a group VIII noble metal on a refractory support, and high-surface-area refractory oxides, and recovering an aryl nitrile selected from the group consisting of benzonitrile and naphthonitrile, wherein the aryl radical is derived from the aromatic hydrocarbon reactant.

2. A method in accordance with claim 1 in which the catalyst is a high-surface-area refractory oxide.

3. A method in accordance with claim 1 in which the catalyst is a group VIII noble metal supported on a high-surface-area refractory oxide.

4. A method in accordance with claim 3 in which the refractory oxide is activated alumina and the concentration of noble metal is about 0.05–2.0% wt.

5. A method in accordance with claim 4 in which the noble metal is rhodium.

6. A method in accordance with claim 4 in which the noble metal is palladium.

7. A method in accordance with claim 4 in which the noble metal is platinum.

8. A method in accordance with claim 4 in which the noble metal is iridium.

9. A method in accordance with claim 4 in which the noble metal is osmium.

10. A method of preparing benzonitrile which comprises reacting benzene with hydrogen cyanide at a temperature of about 500°–600° C. in contact with a catalyst consisting of a group VIII noble metal supported on activated alumina, at a mol ratio of hydrogen cyanide to benzene at 0.1–10.0, atmospheric pressure, and a gaseous hourly space velocity of 50–2000.

11. A method of preparing benzonitrile which comprises reacting benzene with hydrogen cyanide at a temperature of about 500°–650° C. in contact with a catalyst consisting of activated alumina, at a mol ratio of hydrogen cyanide to benzene at 0.1–10.0, atmospheric pressure, and a gaseous hourly space velocity of 50–2000.

12. A method in accordance with claim 1 in which the reaction mixture consists essentially of 0.1–10 mols hydrogen cyanide per mol of aromatic hydrocarbon, and is passed through the reaction zone at substantially atmospheric pressure, at a gaseous hourly space velocity of 50–2000.

References Cited in the file of this patent
UNITED STATES PATENTS

| | | |
|---|---|---|
| 2,449,643 | Cosby | Sept. 21, 1948 |
| 2,872,475 | Gaumer | Feb. 3, 1959 |

UNITED STATES PATENT OFFICE
CERTIFICATE OF CORRECTION

Patent No. 3,042,705                          July 3, 1962

William L. Fierce et al.

It is hereby certified that error appears in the above numbered patent requiring correction and that the said Letters Patent should read as corrected below.

Column 1, line 34, strike out "to", second occurrence; column 2, line 4, for "that" read -- than --; line 58, after "mixture" insert -- was --; column 3, line 21, for "8.4" read -- 8.4% --; lines 23 and 50, for "selectively", each occurrence, read -- selectivity --.

Signed and sealed this 16th day of October 1962.

(SEAL)
Attest:

ERNEST W. SWIDER
Attesting Officer

DAVID L. LADD
Commissioner of Patents